United States Patent
McBeth

(10) Patent No.: US 9,738,296 B2
(45) Date of Patent: Aug. 22, 2017

(54) PORTABLE COOLER WITH SLIDING DRAWERS AND CARRY HANDLE APPARATUS

(71) Applicant: Tynnetta Y. McBeth, Clinton, MD (US)

(72) Inventor: Tynnetta Y. McBeth, Clinton, MD (US)

(*) Notice: Subject to any disclaimer, the term of this patent is extended or adjusted under 35 U.S.C. 154(b) by 0 days.

(21) Appl. No.: 15/162,791

(22) Filed: May 24, 2016

(65) Prior Publication Data

US 2016/0348954 A1    Dec. 1, 2016

Related U.S. Application Data

(60) Provisional application No. 62/167,575, filed on May 28, 2015.

(51) Int. Cl.
*B62B 1/20* (2006.01)
*F25D 3/08* (2006.01)

(52) U.S. Cl.
CPC .............. *B62B 1/20* (2013.01); *F25D 3/08* (2013.01); *B62B 2204/06* (2013.01); *F25D 2400/38* (2013.01)

(58) Field of Classification Search
CPC ... F25D 3/06; F25D 3/08; F25D 25/02; F25D 25/024; F25D 25/025; F25D 2400/38; B62B 1/20; B62B 2204/06
USPC ............................................ 280/47.26, 47.24
See application file for complete search history.

(56) References Cited

U.S. PATENT DOCUMENTS

| | | | |
|---|---|---|---|
| 4,841,661 A | 6/1989 | Moore | |
| 5,605,056 A | 2/1997 | Brown et al. | |
| 6,446,382 B1* | 9/2002 | Cloutier | A01K 97/06 43/54.1 |
| 8,256,156 B1* | 9/2012 | Burgoyne, Jr. | A01K 97/06 206/315.11 |
| 8,256,242 B1* | 9/2012 | Evans | A45C 11/20 62/457.7 |
| 8,567,211 B2 | 10/2013 | Al-Rasheed | |
| 9,150,235 B2* | 10/2015 | Galante | B62B 1/12 |
| 2006/0288730 A1* | 12/2006 | Shill | F25D 3/08 62/457.2 |
| 2016/0244239 A1* | 8/2016 | Nash | A45F 3/04 |

* cited by examiner

*Primary Examiner* — John Walters
(74) *Attorney, Agent, or Firm* — Maier & Maier, PLLC

(57) ABSTRACT

A cooler apparatus with drawers and twist or snap locks may be provided. The cooler may promote the efficient sorting of materials within an insulated membrane. The apparatus may consist of sliding drawers, color coded red-twist locks, and modular sub-compartments that may be used to store materials such as food and ice. The sliding compartments are insulated and the main body of the apparatus is insulated such that extreme insulation by multiple compartments ensures optimal thermal conditioning. Further, the apparatus may have a collapsible carry arm and adjustable handle. The apparatus may be insulated and may be heat resistant. The Apparatus may have a pair of team lift handles and a longer handle for individual mobility. There may be secure points to attach elastic chords such as bungee cords and external fasteners.

12 Claims, 3 Drawing Sheets

PORTABLE COOLER WITH SLIDING DRAWERS AND CARRY HANDLE APPARATUS

CROSS-REFERENCE TO RELATED APPLICATIONS

Figure 1:
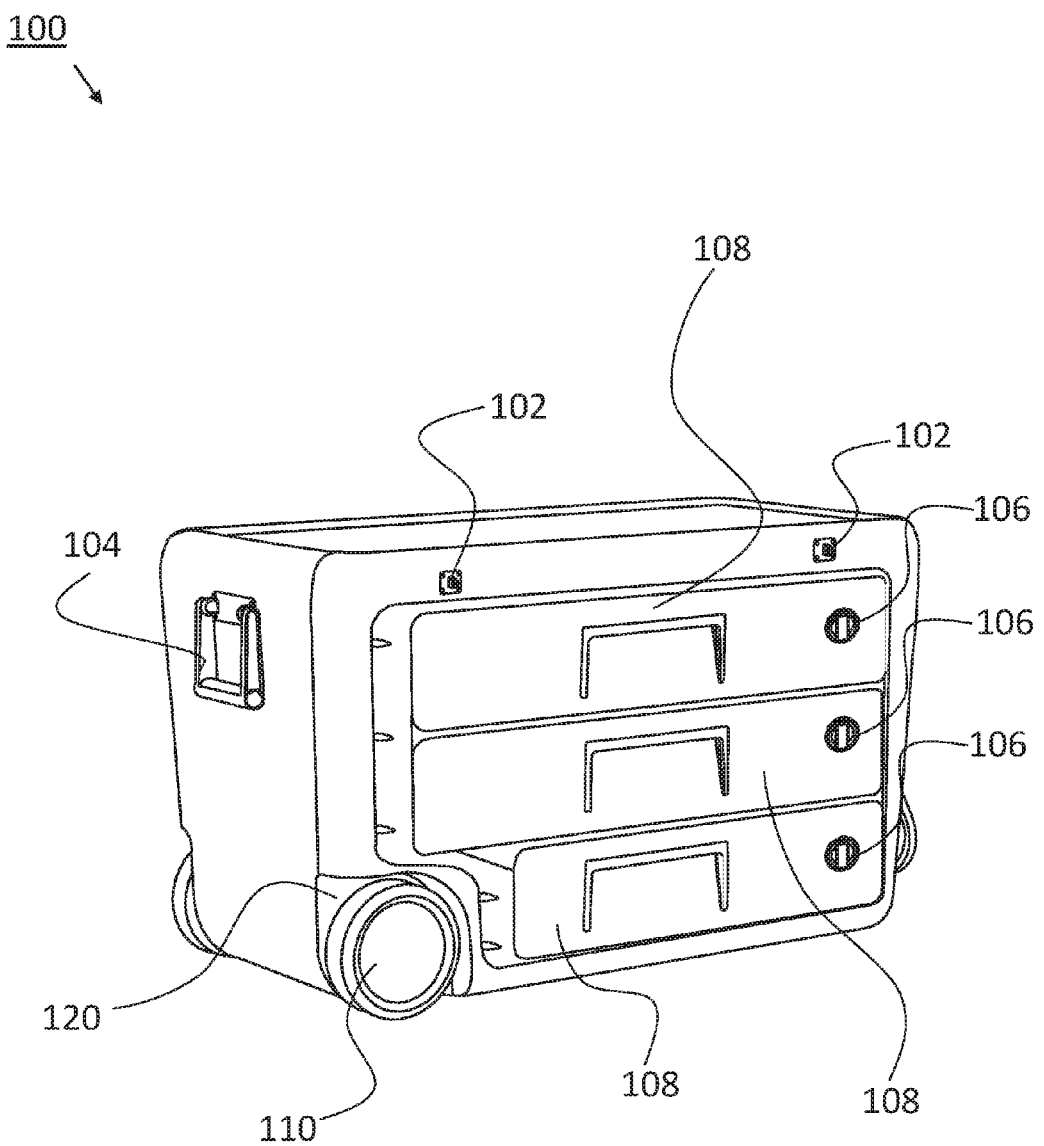

This application claims priority to U.S. Provisional Patent Application No. 62/167,575 filed May 28, 2015 and entitled PORTABLE COOLER WITH SLIDING DRAWERS AND CARRY HANDLE APPARATUS, the entire contents of which are hereby incorporated by reference.

BACKGROUND

Over time, Ice buckets and Ice Coolers have been used to keep food perishable food items from spoiling. Ice Coolers are typically used to keep materials cold, but occasionally are used to keep materials warm. Typical coolers may feature a single large compartment in which ice and materials are stored in the same compartment. The traditional approach may be problematic for individuals that want to store multiple types of materials such as drinks and food that need to be sorted or stored separately at different temperatures. A single compartment makes it very difficult for an individual to find his or her materials at the bottom of the cooler when other materials are piled on top. Additionally, some medical conditions may require that specific food items be separated because of allergens and diabetic concerns. Furthermore, many materials or food types should not be in direct contact with ice and may spoil if submerged under the melted ice or water.

Presently, cooling units are not designed to provide for efficient sorting of materials and are often large and cumbersome. Furthermore, they are not easily transported by a single person.

SUMMARY

According to an exemplary embodiment, a portable cooler apparatus may be disclosed. The portable cooler apparatus may have an insulated body with an insulated frame disposed within the interior of the insulated body. The portable cooler apparatus may have a plurality of sliding drawers operably coupled to the insulated frame wherein the sliding drawers are sized according to the insulated frame. The sliding drawers may be further insulated and may be entirely removable from the portable cooler. The sliding drawers may have a plurality of locking elements disposed onto the sliding drawers such that each locking element can alternate between a closed and open position thereby retaining the drawer in a closed or open position as desired by an end user. The portable cooler apparatus may further have a pair of hinged carry handles that are coupled to opposite sides of the exterior of the insulated body and a pulling handle sized such that one of the carry handles may be wholly circumscribed within the interior perimeter of the pulling handle. In some embodiments the portable cooler apparatus to have a plurality of fasteners coupled to the outside of the insulated body such that bungee cords and other tie downs or netting may be used for various purposes such as additional beneficial cargo space. To assist with mobility of the portable cooler apparatus there may be two wheels coupled to the insulated body. The wheels may be sized and shaped to be disposed within a corresponding wheel cavity of the insulated body.

BRIEF DESCRIPTION OF TILE FIGURES

Figure 2:
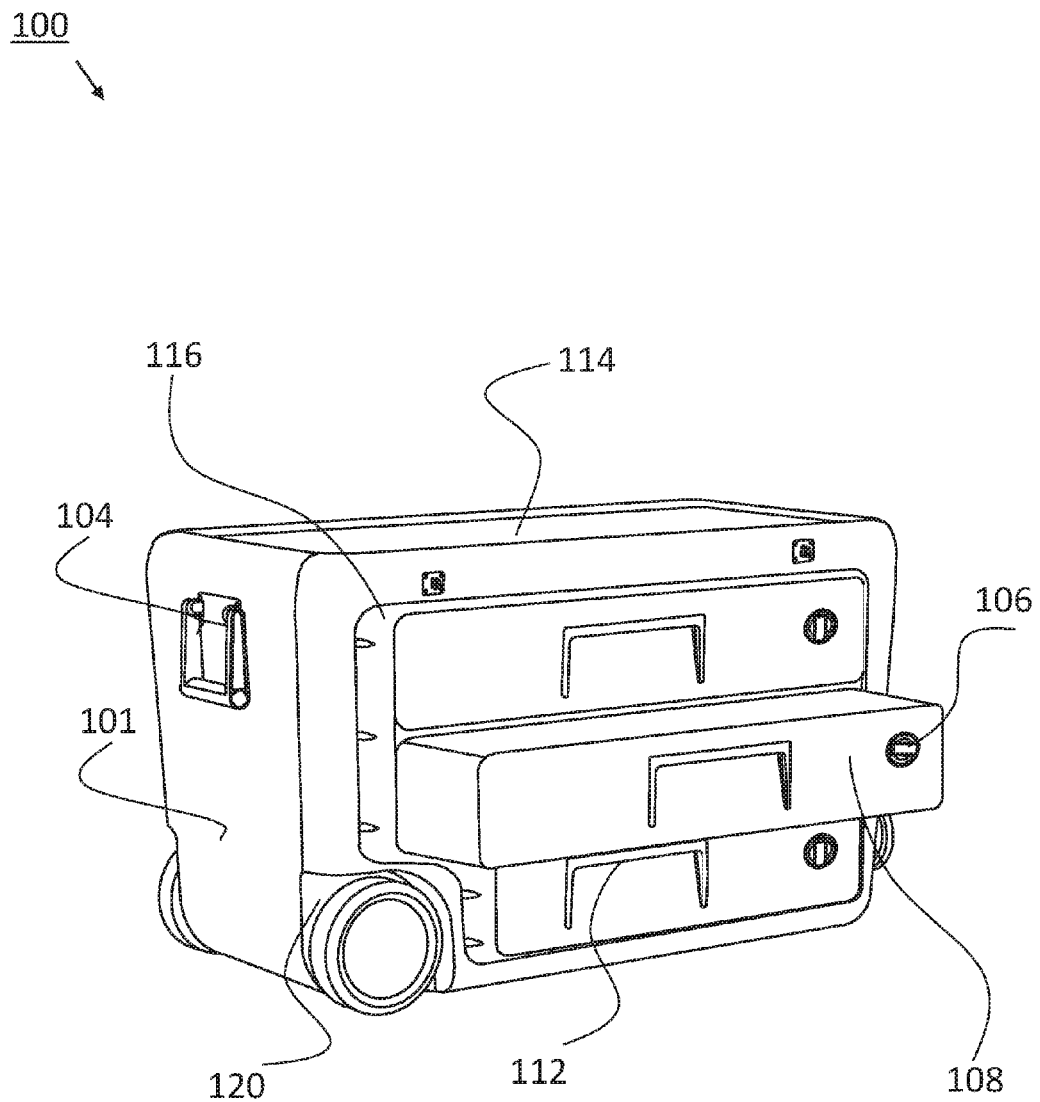
Figure 3:
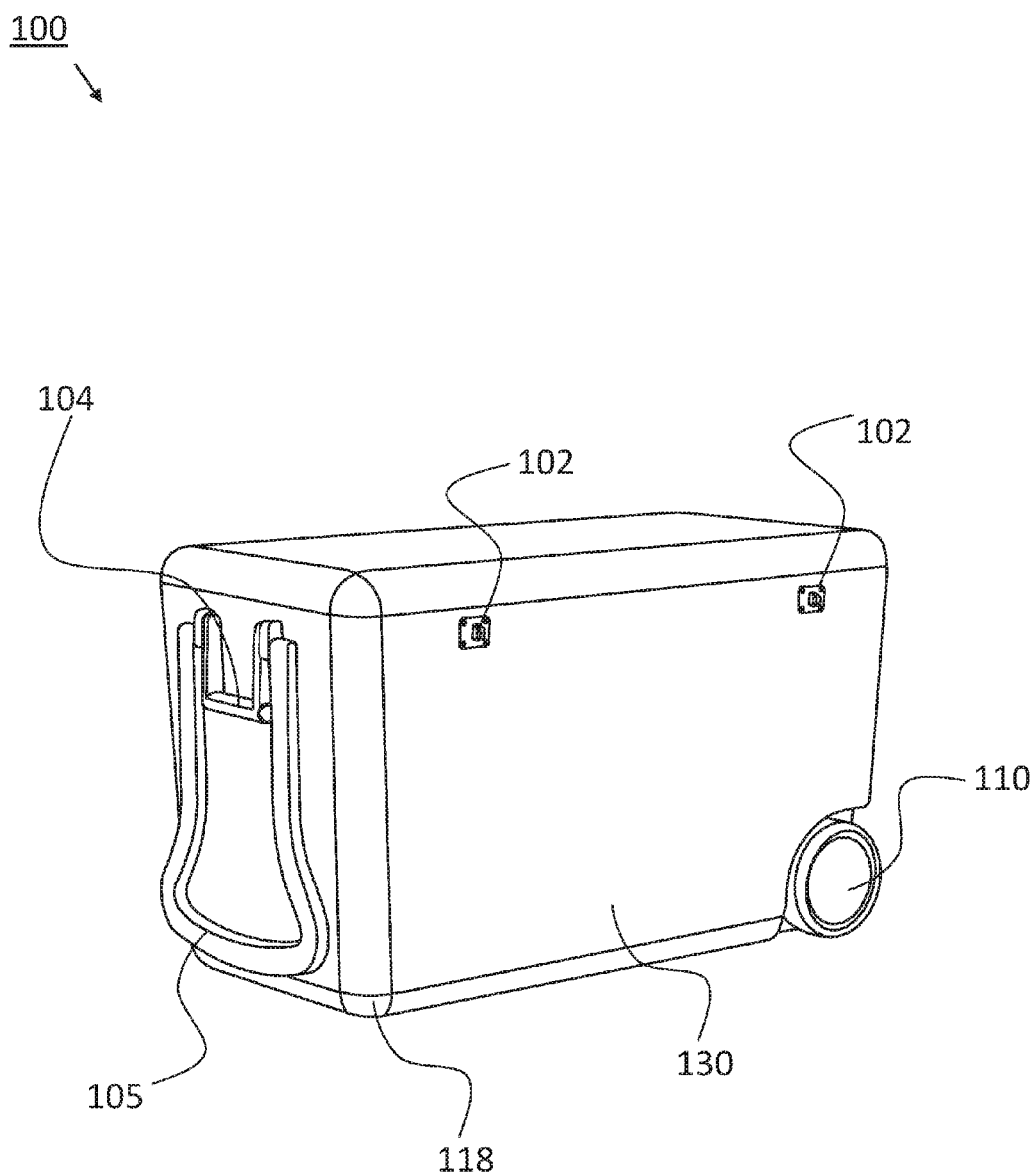

Advantages of embodiments of the present invention will be apparent from the following detailed description of the exemplary embodiments. The following detailed description should be considered in conjunction with the accompanying figures in which:

Exemplary FIG. 1 may show an exemplary embodiment of a front perspective of a portable cooler with sliding drawers;

Exemplary FIG. 2 may show an exemplary embodiment of a portable cooler with sliding drawers in which a drawer is shown in operation;

Exemplary FIG. 3 may show an exemplary embodiment of a rear perspective of a portable cooler with sliding drawers.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Referring to the figures generally, a portable cooler apparatus 100 may be disclosed. The portable cooler apparatus 100 may have an insulated body 101. Insulated body 101 may be insulated by styrofoam, plastic, double insulated walls, or any other suitable material as would be understood by a person having ordinary skill in the art. The insulated body 101 may further be tailored such that an insulated frame 116 may couple to the insulated body 101. The insulated frame 116 may be permanently fixed to the cooler or may by removable by sliding in and out of a cavity in the sidewall of the insulated body 101. The removability of the insulated frame 116 may assist with cleaning of the interior spaces of the insulated body 101. The removability may also assist with ease of manufacturing and customization. In at least one embodiment, the insulated frame 116 may be insulated at the front of the frame whereas there may not be any insulation at the rear and sidewalls. In a further embodiment insulated frame 116 may permanently coupled to the insulated body 101. In other embodiments, the insulated frame 116 may be a rigid frame without insulation. The insulated frame may be sized to receive a plurality of sliding drawers 108.

Referring to the figures generally, a portable cooler apparatus 100 may be disclosed. The portable cooler apparatus may have a plurality of sliding drawers 108 that may operably slide in and out of an insulated frame 116 as shown most clearly in FIG. 2. The insulated frame 116 may be sized according to varying thicknesses and types of insulated materials of sliding drawer 108 as would be understood by a person having ordinary skill in the art. The sliding drawers 108 may operably slide in and out by a rail system, slider system, or any other system as may be understood by a person having ordinary skill in the art. The sliding drawers 108 may be fully removable to facilitate cleaning for hygienic purposes. The sliding drawers 108 may also have a drain plug so that moisture, condensation, ice, etc. may be easily drained from individual drawers. Each sliding drawer 108 may have drain plugs that connect to a main drain line of the portable cooler apparatus such that a comprehensive drainage solution is provided. For example, the drainage area of the top drawer may align with the drainage area of the next lowest drawer and the drainage area of the next lowest drawer and so on. The portable cooler apparatus 100 may also have a master drain plug thereby providing the portable cooler apparatus (as a comprehensive unit) a master outlet for drainage purposes.

Referring to the figures generally, a portable cooler apparatus 100 may be disclosed. In at least one embodiment, the sliding drawers 108 may have a recessed handle 112. In other embodiments, the sliding drawers 108 may have handles as an attached form of hardware. In other embodiments still, the sliding drawers 108 may not have a handle and may simply feature a smooth cavity that may operably serve as a handle. The sliding drawers 108 may be further enhanced with the inclusion of a locking element 106. The locking element 106 may be a twisting knob with a twisting plate that retains the sliding drawers 108 in place by bracing against the interior of the insulated frame 116. The locking element 106 may be color coded red such that a person of average intelligence would naturally understand by way of the color red that the locking element may be used to "stop" the drawers from opening. In other embodiments, the locking element 106 may be a push tab, a latch, or any other locking element 106 that would be understood by a person having ordinary skill in the art. The locking element 106 may operate from a first closed position to an open position by turning the knob, push tab, latch, etc. The knob, push tab, latch etc. may catch onto the insulated frame 116 at any feasible location such that the sliding drawers 108 are retained within the portable cooler apparatus 100.

Referring to the figures generally, a portable cooler apparatus 100 may be disclosed. The portable cooler apparatus 100 may have a pair of carry handles 104 coupled to opposite sides of the exterior of the insulated body 101. The carry handles 104 may be coupled by a hinge or pin. The carry handles 104 may be smooth plastic elements or they may be coated with a rubberized coating for shock absorption and further protection. In at least one embodiment, the carry handle 104 may be further ergonomically enhanced by featuring indentations and recessions such that the fingers of a human hand can comfortably grip the handles. Stated another way, the handles may have ridges at equal spacing to accommodate the size of an average human finger. The carry handle may also be sized to fit within a pulling handle 105. Pulling handle 105 may be a long handle with a hinge or pin element. The long handle may be beneficial for pulling the portable cooler apparatus 100. The pulling handle 105 may be a smooth plastic element or it may be coated with rubberized coating for shock absorption and further protection. In at least one embodiment, the pulling handle 105 may be further ergonomically enhanced by featuring indentations and recessions such that the fingers of a human hand can comfortably grip the handles. Stated another way, the handles may have ridges at equal spacing to accommodate the size of an average human finger. The pulling handle 105 may be a telescoping handle or retractable handle as would be understood by a person having ordinary skill in the art. The pulling handle 105 may be on an opposite side of the wheels 110. The pulling handle 105 may be of a sufficient length such that a user may partially lift the adjoining side of the portable cooler apparatus 100 away from a surface such as the ground and conveniently pull the portable cooler apparatus 100 by way of the wheels 110 on the opposite side of the portable cooler apparatus 100.

Referring to the figures generally, a portable cooler apparatus 100 may be disclosed. The portable cooler apparatus 100, may have wheels 110 disposed within a wheel cavity 120. The wheel cavity 120 may be sized according to the size of the wheels 110 with ample clearance space. The wheels 110 may be plastic, rubber, or any hybrid type of material as would be understood by a person having ordinary skill in the art. For example, hard plastic wheels may be advantageous for portable cooler apparatus 100 that are customized for usage on sand whereas rubber wheels may be advantageous for portable cooler apparatus 100 that are used on hard surfaces such as concrete. The wheels 110 and wheel cavity 120 may be disposed on an opposite side of the pulling handle 105.

Referring to the figures generally, a portable cooler apparatus 100 may be disclosed. The portable cooler apparatus 100 may have a plurality of fasteners 102 coupled to the outside of the insulated body 101. In at least one embodiment, fasteners 102 may be disposed to the insulated body 101 above the sliding drawers 108. Fasteners 102 may correspond to an elastic net or netting which may be removable. In at least one embodiment, the portable cooler apparatus 100 may have four fasteners 102 coupled to a first front face and a second rear face substantially near the upper region of each corresponding face. The aforementioned arrangement may allow further enhancement by the addition of a bungee net, cargo-net, carry straps, or other rigging elements as would be understood by a person having ordinary skill in the art.

Referring to the figures generally, a portable cooler apparatus 100 may be disclosed. The portable cooler apparatus 100 may also be designed to facilitate easy sliding and prevent abrasive contact by having a plurality of rounded chamfered corners 118. Chamfered corners 118 may provide aesthetic utility, structural rigidity, and facilitate ease of use by preventing snagging points. In at least one embodiment, the portable cooler apparatus 100 may be coated by an ultraviolent resistant mat such as a UV Inhibitor that may increase the resiliency to wear and tear from direct exposure to the sun. The Ultra-Violent resistant material may be a clear coating applied to the portable cooler apparatus or it may be chemically bonded to the portable cooler apparatus 100 as would be understood by a person having ordinary skill in the art.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A portable cooler apparatus comprising:
   an insulated body having a front wall, a rear wall, and two sidewalls;
   an insulated frame disposed within an interior of the insulated body, the insulated frame being removable from the insulated body via a cavity in at least one of the two sidewalls;
   a plurality of sliding drawers operably coupled to the insulated frame wherein the sliding drawers are sized according to the insulated frame;
   a plurality of locking elements wherein at least one locking element is disposed on the sliding drawers such that each locking element can alternate between a closed and open position, the plurality of locking elements positioned so as to brace against an interior of the insulated frame when in the closed position to retain the sliding drawers therein;
   a pair of hinged carry handles coupled to opposite sides of an exterior of the insulated body;
   a pulling handle sized such that the carry handle may be wholly circumscribed within an interior perimeter of the pulling handle;
   a plurality of fasteners coupled to the exterior of the insulated body and disposed above the plurality of sliding drawers, the plurality of fasteners configured to secure a removable netting between the two side walls; and
   at least two wheels coupled to the insulated body wherein the wheels are sized and shaped to be disposed within a corresponding wheel cavity of the insulated body.

2. The portable cooler apparatus of claim 1, wherein the carry handles are ergonomically shaped to a human hand.

3. The portable cooler apparatus of claim 1, wherein the pulling handle is ergonomically shaped to a human hand.

4. The portable cooler apparatus of claim 3, wherein the pulling handle telescopes outward thereby extending a length of the pulling handle.

5. The portable cooler apparatus of claim 4, wherein the sliding drawers have a recessed handle.

6. The portable cooler apparatus of claim 5, wherein the reinforced top is coupled to the insulated body by a pair of hinges.

7. The portable cooler apparatus of claim 1, wherein the sliding drawers have a drain plug.

8. The portable cooler apparatus of claim 1, wherein a reinforced top is coupled to the insulated body.

9. The portable cooler apparatus of claim 5, wherein the locking elements are color coded red.

10. The portable cooler apparatus of claim 1, wherein the insulated body has a master drain plug.

11. The portable cooler apparatus of claim 1, wherein the insulated body has a plurality of rounded corners.

12. The portable cooler apparatus of claim 1, wherein the portable cooler apparatus is coated with an ultraviolet resistant material.

* * * * *